Oct. 13, 1970    W. A. MALLINSON    3,534,349

DATA TRANSMISSION SYSTEMS

Filed Dec. 19, 1967

Inventor
W. A. MALLINSON

By
Cameron, Kerkam & Sutton
Attorneys

United States Patent Office 3,534,349
Patented Oct. 13, 1970

3,534,349
DATA TRANSMISSION SYSTEMS
William Arthur Mallinson, Bagshot, England, assignor to Ferranti, Limited, Hollinwood, England, a company of the United Kingdom of Great Britain and Northern Ireland
Filed Dec. 19, 1967, Ser. No. 691,878
Claims priority, application Great Britain, Jan. 12, 1967, 1,650/67
Int. Cl. G08c 19/00
U.S. Cl. 340—198
2 Claims

ABSTRACT OF THE DISCLOSURE

A synchro data transmission link is provided with apparatus for detecting faults affecting the windings of the synchros. The fault detecting apparatus comprises means for injecting direct currents into the stator winding circuit and detecting any changes in these currents caused by fault conditions.

This invention relates to data transmission systems of the type comprising two or more synchros having their stator windings interconnected, and to means for detecting faults in such systems.

Synchro data transmission systems are commonly used to provide remote indication and control of mechanical displacement. Essentially such a system comprises of synchro transmitter, having a single-phase rotor fed with alternating current and a three-phase stator, and some form of synchro receiver such as a control transformer. The receiver has a three-phase stator winding which is connected directly to the transmitter stator winding by three conductors. Several types of synchro receiver are well-known, and deliver either electrical or mechanical outputs in dependence upon the angular position of the rotor relative to that of the transmitter rotor.

Common faults affecting synchro systems are open or short circuits affecting one of the rotor or stator windings of a synchro. It is relatively simple to detect such a fault in the rotor winding of a synchro, but hitherto no simple method has existed for detecting such a fault affecting the stator windings or their interconnections. Several systems do exist for detecting such faults, but these involve inserting resistive, inductive or capacitive circuit elements onto the conductors interconnecting the transmitter and receiver stator windings, and these may in some circumstances affect the transmission accuracy of the system.

Measurement of the alternating currents in the three stator interconnections is not always satisfactory, partly because these currents are very small, and also because some faults do not produce a significant change in the current distribution.

An object of the invention is to provide a synchro data transmission system which includes means for detecting open or short circuit faults in the synchro windings or their interconnections.

According to the present invention a data transmission system of the type comprising two or more synchros having their stator windings interconnected by three conductors includes a first current path comprising a direct current source connected in series with a first resistor between a first pair of the conductors, a second current path comprising a direct current source connected in series with a second resistor between a second pair of the conductors, a third resistor connected between the remaining pair of conductors, and a detector connected between a point on the third resistor and the conductor common to the first and second pairs, the first, second and third resistors being of equal resistance and the two current sources being of unequal E.M.F. and oppositely poled with respect to the common conductor, said point on the third resistor being so adjusted as to have a predetermined potential with respect to the common conductor in the absence of a fault in the data transmission system, said detector being such as to give a fault indication when the potential difference between said point on the third resistor and the common conductor departs from said predetermined value.

The invention will now be described with reference to the accompanying drawings, in which.

Figure 1:
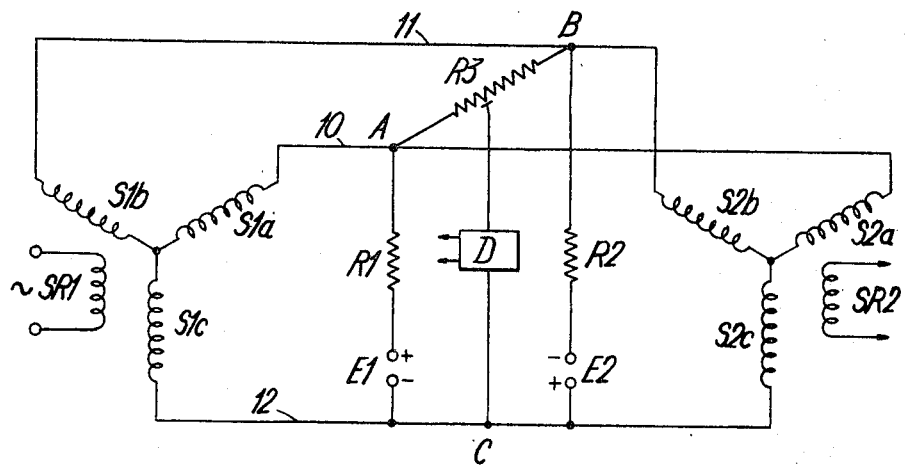
FIG. 1 is a circuit diagram of a first embodiment of the invention.

Referring now to FIG. 1, this shows a data transmission link comprising a synchro transmitter and a control transformer. The rotor SR1 of the transmitter is connected to a source of alternating current. The three stator windings S1a, S1b and S1c are connected by separate conductors 10, 11 and 12 to the corresponding stator windings S2a, S2b and S2c of the control transformer. The rotor SR2 of the control transformer delivers an electrical output signal.

The connections so far described are the usual ones for a system having two synchros, though they may be changed slightly if a different type of synchro receiver is used.

The remaining components shown form the fault-detecting circuit of the system. A first resistor R1 is connected in series with a direct current source E1 to form a first current path between a first pair of the conductor, conductors 10 and 12, say, the combination being connected to the conductors at points A and C respectively, Similarly a second resistor R2, of the same resistance as R1, is connected in series with a second direct current source E2 to form a second current path between a second pair 11 and 12 of the conductors, the combination being connected to the conductors at points B and C respectively. Finally a third resistor R3 of the same resistance as resistors R1 and R2 is connected between the remaining pair 10 and 11 of the conductors, at points A and B. Resistor R3 is provided with a tapping point, preferably movable. A detector D is connected between this tapping point and the common conductor 12 of the first and second pairs at point C, and is connected to a suitable warning device.

The two direct current sources E1 and E2 are oppositely poled as shown with respect to the common conductor 12 and must be of different E.M.F.

Figure 2:
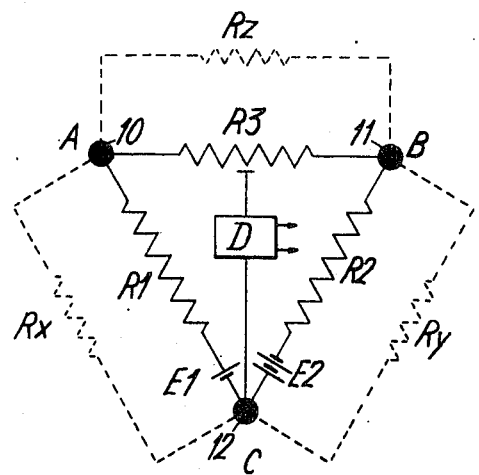
FIG. 2 is a simplified diagram of the embodiment of FIG. 1.

FIG. 2 shows the fault-detection circuit in a different form, the stator windings of the synchros being shown in broken line by the equivalent resistors Rx, Ry, and Rz. The operation of the arrangement will be described with reference to FIG. 2.

It will be seen that direct currents will circulate through the stator windings and through the resistors R1, R2 and R3. The arrangement forms a simple bridge circuit, and by moving the tapping point on resistor R3 it is possible to adjust the potential of that point to a predetermined value with respect to the common conductor 12 so as to reduce the current flowing through the detector to zero, or to any other preferred value. If an open-circuit or a short-circuit fault occurs affecting any of the stator windings of their interconnecting conductor 10, 11 and 12 then the distribution of the direct currents will change and cause a current to flow in one direction of the other through the detector D. This in turn will cause the operation of the alarm system.

The three resistors R1, R2 and R3 are made equal so that their presence does not affect the distribution of the alternating currents in the system. For a similar reason the resistors will be of fairly high resistance value, compared with which the resistance of the two current sources and the synchro stator windings are negligible.

It is necessary to provide two direct current sources of opposite polarity with respect to conductor 12 and different E.M.F. in order to detect every possible short-circuit or open-circuit fault which may occur. Furthermore, if the two sources are of the same value, or of equal polarity, or both, then it is not possible to obtain a balance point for the detector on resistor R3.

By way of example only, a suitable resistance value for each of the three resistors is 10K ohms, with the E.M.F. of source E1 being 100 volts and that of E2 being 150 volts.

The passage of small direct currents through the stator windings of the synchros may cause a small angular shift in the zero position of the system. However this shift will be substantially constant, so long as the direct currents remain steady, and may be corrected by turning the transmitter synchros through the same small angle.

The two sources of direct current E1 and E2 should preferably be obtained from the same power supply so that a change in the potential of one is accompanied by a proportionate change in the potential of the other.

Although the invention has been described with reference to system comprising only two synchros, it is equally applicable to systems having more than two, so long as the stator winding of all the synchros are interconnected by three common conductors.

What I claim is:

1. A data transmission system of the type comprising two or more synchros having their stator windings interconnected by three conductors, which includes a first current path comprising a direct current source connected in series with a first resistor between a first pair of the conductors, a second current path comprising a direct current source connected in series with a second resistor between a second pair of the conductors, a third resistor connected between the remaining pair of conductors, and a detector connected between a point on the third resistor and the conductor common to the first and second pairs, the first, second and third resistors being of equal resistance and the two current sources being of unequal E.M.F. and oppositely poled with respect to the common conductor, said point on the third resistor being so adjusted as to have a predetermined potential with respect to the common conductor in the absence of a fault in the data transmission system, said detector being such as to give a fault indication when the potential difference between said point on the third resistor and the common conductor departs from said predetermined value.

2. A data transmission system as claimed in claim 1 in which the said point on the third resistor to which the balance detector is connected is a movable tapping point.

References Cited
UNITED STATES PATENTS 2,879,501    3/1959    Baran    340—198 X
3,038,149    6/1962    Sylvander    340—198

DONALD J. YUSKO, Primary Examiner

M. SLOBASKY, Assistant Examiner

U.S. Cl. X.R.
340—181